Dec. 8, 1964 H. H. STAIR 3,160,824

FREQUENCY COMPENSATED AMPLIFIER FOR MAGNETIC TAPE PLAYBACK

Filed Sept. 11, 1961

INVENTOR.
HENRY H. STAIR
BY
Christie, Parker & Hale
ATTORNEYS.

United States Patent Office 3,160,824
Patented Dec. 8, 1964

3,160,824

FREQUENCY COMPENSATED AMPLIFIER FOR MAGNETIC TAPE PLAYBACK

Henry H. Stair, San Jose, Calif., assignor to Consolidated Electrodynamics Corporation, Pasadena, Calif., a corporation of California Filed Sept. 11, 1961, Ser. No. 137,209
6 Claims. (Cl. 330—28)

This invention relates to transistor amplifier circuits, and more particularly is concerned with a playback amplifier for use in a magnetic recorder having equalizing characteristics which compensate for the frequency characteristics of the magnetic head.

It is well known that the pickup head in a magnetic tape recorder, with a constant flux recording, has a frequency characteristic in the middle range in which the signal level derived from the pickup head increases approximately 6 db per octave. As the frequency is increased to the higher operating range, the signal level reaches a peak and then begins to drop off approximately −16 db per octave. Amplitude equalizer circuits have been used heretofore in the playback amplifier having a transfer characteristic which is the reverse of the frequency characteristic of the playback head. This characteristic has been achieved in the past by using passive reactances in feedback loops or by placing passive filters between active amplifying stages.

To improve the frequency response at the higher frequencies, careful attention is given to the mechanical design of the head, particularly the contour of the head where the tape passes across the magnetic gap. However, design for maximum effect at the upper frequency end has an adverse effect at the low frequency end of the recording band. Low frequency compensation has not been practical with conventional equalization circuits heretofore employed.

The present invention provides an equalization circuit which makes it very easy to achieve a substantial degree of low frequency equalization. The equalization circuit of the present invention also provides useful noise suppression characteristics at the low frequency end of the band where 60 cycle pickup noise is often a problem. The low frequency slope may be adjusted independently of the characteristic over the mid-frequency and high frequency regions. This makes it possible to compensate for contour effects of the playback head in the low frequency region. At the same time, the circuit provides equalization over the mid-frequency and high frequency portions of the recording band.

In brief, the present invention achieves equalization by using a passive network as a degenerative impedance in the emitter of a common emitter amplifier circuit. This passive impedance forms a resonant circuit with the input circuit to the amplifier stage at the low frequency end of the recording band. By means of a variable resistance, the Q of this low frequency resonant circuit can be adjusted to provide a simple means for controlling low frequency equalization.

These and other features of the invention may be more fully appreciated when considered in the light of the following specification and drawings, in which.

Figure 1:
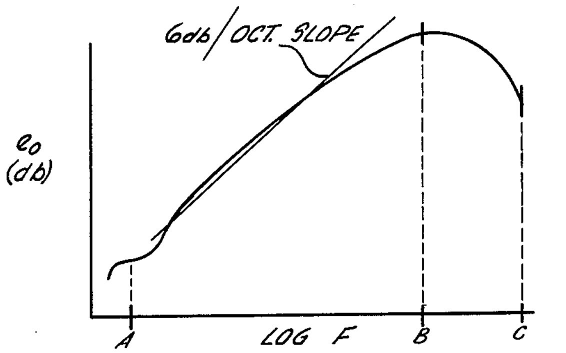
FIGURE 1 is a graph showing the transfer characteristics from magnetic tape through a magnetic playback head.
Figure 2:
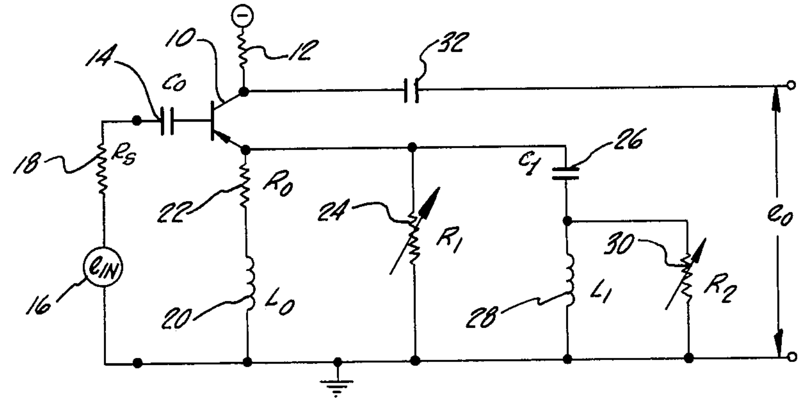
FIGURE 2 is a schematic diagram of the equalization circuit of the present invention.

Referring to FIGURE 1 in detail, a typical curve of the output voltage produced by a readout head, assuming a constant flux recording, as a function of frequency is shown. It will be noted that over the middle frequency range, the voltage increases substantially 6 db per octave and then gradually tails off, going into a negative characteristic at the high frequency end of the band. At the low frequency end, the voltage goes through a slight perturbation which is the result of the particular mechanical design of the playback head being used. This can not be eliminated by design modification except at the expense of high frequency response. In order to equalize the amplitude of the output voltage from the playback head, an amplifier circuit having a transfer characteristic which is the inverse of the characteristic shown in FIGURE 1 is required.

The amplitude equalizer circuit of the present invention provides good equalization and may be adjusted to give improved equalization which is tailored to the particular characteristic of the head being used.

Considering the circuit in detail, the numeral 10 indicates generally a transistor which is shown as a PNP junction transistor in which the collector electrode is connected through a load resistor 12 to a negative potential source. The input signal is connected to the base of the transistor 10 through a coupling capacitor 14 of value $C_0$. The input signal is shown as derived from a signal source 16 having a source impedance represented by a resistor 18 and having a value $R_s$. The signal source may be the magnetic playback head itself, or it may be an intermediate amplification stage. In either event, the source impedance should be of a low value.

A passive network is connected as a degenerative impedance in the emitter of what is basically a common emitter amplifier stage. This impedance includes three parallel current paths, the first of which includes an inductor 20 of value $L_0$, in series with a resistor 22 of value $R_0$. The second parallel path comprises a variable resistor 24 having a value $R_1$. The third path is a series resonant circuit including a capacitor 26 in series with an inductor 28. The capacitor 26 has a value $C_1$ and the inductor has a value $L_1$. A variable resistor 30, having a value $R_2$, may be connected in shunt across the inductor 28. The output signal $e_0$ is derived from the collector electrode through a coupling capacitor 32.

Figure 3:
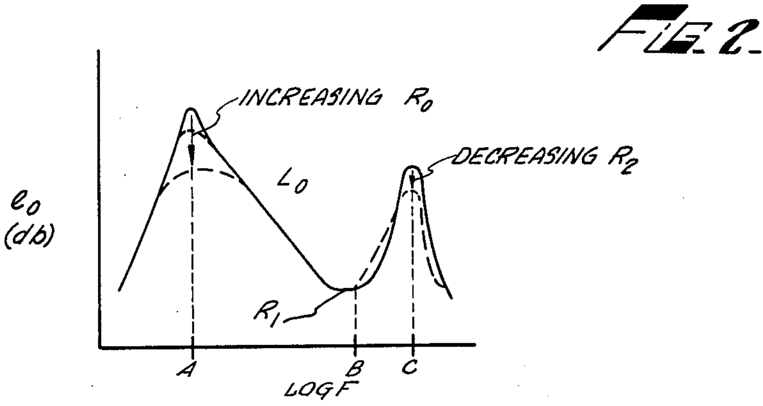
FIGURE 3 is a graph showing the amplitude characteristics of the equalizer circuit of FIGURE 2.

Over the mid-frequency range as shown in FIGURE 3, the inductor 20 provides an increasing impedance and increases the degeneration such that the output voltage $e_0$ drops off approximately 6 db per octave. While the impedance of the inductor 20 continues to increase, the shunting resistor 24 limits the maximum impedance of the emitter network, so that the transfer characteristic of the amplifier begins to flatten out near the upper end of the mid-frequency range.

In the high end of the frequency band, the inductor 28 and capacitor 26 are made series resonant, providing a low shunting impedance in the network. This produces the righthand peak in the transfer curve shown in FIGURE 3. The variable resistor 30 can be adjusted to control the Q of the resonant circuit. By decreasing the value $R_2$ of the resistor 30, the shape of the peak can be modified as indicated by the dash lines. Thus it will be apparent that by the combined adjustment of $R_1$, and $R_2$, the transfer curve can be shaped to match the inverse of the head characteristic of FIGURE 1 in the peak region at the upper end of the frequency band.

At the low frequency end of the recording band, the inductor 20 forms a series resonant circuit with the input capacitance. The Q of this resonant circuit is determined by the effective emitter-base impedance of the transistor 10 and the source impedance $R_s$. The series resonance of this circuit forms the lower frequency peak of the transfer curve in FIGURE 3. By increasing the resistance $R_0$ of the resistor 22, this peak can be reduced, as indicated by the dotted lines. The frequency at the peak is adjusted to correspond to the frequency of the drop off in the output signal of the head, as shown by the curve of FIGURE 1. This may be around 85 cycles. The gain of the amplifier drops off abruptly below this peak, so that the signal level at the 60 cycle hum frequency is greatly attenuated.

It will be seen that the values $R_0$, $R_1$, and $R_2$ can be varied to control respectively the maximum gain at the two peaks and the minimum gain in the mid-frequency range. Thus the circuit can be easily adjusted to provide compensation over the full band for the characteristic of the magnetic head. By properly adjusting $R_0$ and $C_0$, the low frequency slope may be from 5–7 db over a 5:1 frequency range. With a normal lower cutoff frequency of 100 cycles in the recording band, considerable attention at 60 cycles can be achieved without adversely affecting the response at the cutoff frequency. Because of the impedance multiplication through transistor action, the series resonance effect at the lower end of the recording band can be achieved with practical component values. At the same time, the contour effect of the head at low frequencies can be partially compensated for by adjusting the lower series resonance frequency and Q.

What is claimed is:

1. A compensating amplifier for a magnetic tape playback circuit comprising a transistor having base, collector, and emitter electrodes, an input capacitor coupling the input signal to the base electrode of the transistor, a load resistor connecting the collector electrode to a potential source, and an impedance network connected to the emitter electrode and to a junction common to the amplifier input and output, the impedance network having parallel connected impedance branches between the emitter and common junction including a first resistor and first inductor in series, a second resistor, and a capacitor and second inductor in series, the first inductor being series resonant with the input capacitor at the low end of the recording frequency band and the second inductor and series capacitor being series resonant at the high end of the recording frequency band.

2. A compensating amplifier for a magnetic tape playback circuit comprising a transistor having base, collector, and emitter electrodes, an input capacitor coupling the input signal to the base electrode of the transistor, a load resistor connecting the collector electrode to a potential source, and an impedance network connected to the emitter electrode and to a junction common to the amplifier input and output, the impedance network having parallel connected impedance branches between the emitter and common junction including a first resistor and first inductor in series, and a capacitor and second inductor in series, the first inductor being series resonant with the input capacitor at the low end of the recording frequency band and the second inductor and series capacitor being series resonant at the high end of the recording frequency band.

3. A compensating amplifier for a magnetic tape playback circuit comprising a transistor having base, collector, and emitter electrodes, an input capacitor coupling the input signal to the base electrode of the transistor, a load resistor connecting the collector electrode to a potential source, and an impedance network connected to the emitter electrode and to a junction common to the amplifier input and output, the impedance network having an impedance connected between the emitter and common junction including a first resistor and first inductor in series, the first inductor being series resonant with the input capacitor at the low end of the recording frequency band.

4. A compensated magnetic tape playback circuit, comprising a common emitter transistor amplifier stage having an input and an output, means including a capacitor coupling a playback signal to the input, and an impedance connected to the emitter including an inductance that is series resonant with the coupling capacitor near the lower cutoff frequency of the recording band of the playback circuit.

5. An amplifier circuit comprising a transistor having three electrodes, input and output terminals, a potential source connected at one end to a common junction, a capacitor connected between the input terminal and one of said electrodes, a load resistor connecting a second one of the electrodes to the potential source, means connecting the output terminal to the second one of the electrodes, and an impedance connecting a third one of the electrodes to the common junction, the impedance including an inductance forming a series resonant circuit with the said capacitor through the first and third electrodes of the transistor.

6. Apparatus as defined in claim 5 further including a second series resonant inductor and capacitor circuit connected between the third electrode of the transistor and the common junction, the second series resonant circuit having a resonance frequency of a higher frequency than the first mentioned resonant circuit.

References Cited in the file of this patent

UNITED STATES PATENTS

| | | |
|---|---|---|
| 2,215,796 | Rust et al. | Sept. 24, 1940 |
| 2,289,821 | Boucke | July 14, 1942 |

OTHER REFERENCES

Chow et al.: "Series Tuned Methods in Transistor Radio Circuitry," in IRE Transaction on Circuit Theory, page 174, September 1957.